United States Patent [19]

McDowell

[11] E Re. 29,255

[45] Reissued June 7, 1977

[54] PHOTOGRAPHIC LAYERS CONTAINING PERFLUORO COMPOUNDS AND COATING THEREOF

[75] Inventor: Maurice James McDowell, Media, Pa.

[73] Assignee: E. I. Du Pont de Nemours and Company, Wilmington, Del.

[22] Filed: May 25, 1973

[21] Appl. No.: 364,146

Related U.S. Patent Documents

Reissue of:

[64] Patent No.: 3,589,906
Issued: June 29, 1971
Appl. No.: 768,169
Filed: Oct. 16, 1968

[52] U.S. Cl. ..... 96/87 R; 96/85; 96/114.5; 106/135; 106/238

[51] Int. Cl.[2] ..... G03C 1/38; G03C 1/33

[58] Field of Search ..... 96/89, 87 R, 114.5; 106/135, 238

[56] References Cited

UNITED STATES PATENTS

| | | | |
|---|---|---|---|
| 2,559,751 | 7/1951 | Berry et al. | 252/353 X |
| 2,779,684 | 1/1957 | Alles | 117/138.8 F X |
| 2,877,267 | 3/1959 | Tiers et al. | 252/353 X |
| 3,068,101 | 12/1962 | Knox et al. | 96/114.5 |
| 3,133,816 | 5/1964 | Ben-Ezra | 96/114.5 |
| 3,169,870 | 2/1965 | Knox et al. | 96/114.5 |
| 3,353,958 | 11/1967 | Moede | 96/87 |
| 3,471,484 | 10/1969 | Guenthner | 252/351 X |

*Primary Examiner*—James R. Hoffman

[57] ABSTRACT

Acrylic polymer layers and colloidal silver halide photographic emulsions are coated to form layers without repellent spots from solutions containing a perfluoro compound [containing an intralinear carbonyl or sulfonyl group selected from the group: (1) perfluorocarbon compounds derived from perfluorocarboxylic acids having the general structure

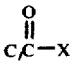

where $C_f$ is a fully fluorinated (perfluoro) saturated chain consisting of five or more carbon atoms which may or may not be an oxygen-interrupted carbon chain; X=OY or an amino group, where Y is H, alkali metal or an ammonium group, and (2) perfluoro compounds] derived from perfluorosulfonic and perfluorosulfuric acids having the general structure

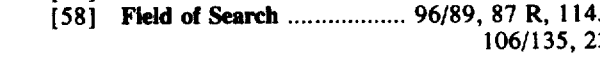

where $C_f$ is a fully fluorinated (*perfluoro*) *saturated* carbon chain [as defined in paragraph (1)] *having six or more carbon atoms which may or may not be an oxygen-interrupted carbon chain*; $C_H$ is the saturated hydrocarbon portion of the same carbon chain; X is $SO_2$ or $SO_3$; Z is an amino or hydroxyl group, alkali metal or an ammonium group; [x=6 or greater; y=2 or more.] *y=0 or more.*

16 Claims, No Drawings

PHOTOGRAPHIC LAYERS CONTAINING PERFLUORO COMPOUNDS AND COATING THEREOF

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to the treatment of contaminated aqueous systems. More particularly, this invention is concerned with the elimination of oil and grease caused repellent spots from layers coated from aqueous systems during the manufacture of a photographic product.

Description of Prior Art

The presence of oily contaminants in aqueous systems creates process control and quality control problems. These problems are particularly apparent in photographic coating operations wherein the surface tension of these contaminants differs from that of the material being coated. Under these conditions, small areas of the final product will remain uncoated after passing through the coating operation. These uncoated areas are known as repellent spots.

In preparing silver halide emulsions by the precipitation of silver halide in an aqueous colloid medium, gelatin is the most often used film-forming colloid. It has been recognized however that because of its natural origin, the variety and impurity of the raw material from which it is made, and the method of its preparation gelatin may contain certain natural animal oils and greases. These natural oils and greases have no effect on the photochemical reaction that occurs during the exposure of the emulsion to actinic radiation, but are a cause of repellency when the gelatin emulsion is coated on a support. During the preparation of photographic gelatin, photographic emulsions, or other photographic coatings, moreover, the coating is occasionally unintentionally contaminated by various petroleum oils used to lubricate the apparatus involved. These oils also cause repellent spots.

Repellent spots also appear with high incidence in the matte layer of wash-off drafting film and interfere with the manufacture of the material. These spots are often caused by silicone grease used in pump maintenance in the manufacture of matte underlayers.

In addition to repellency between an emulsion and a base support, oily or greasy contaminants can also cause repellency between two emulsion layers and between an abrasion layer and an emulsion layer. This repellency defect so caused usually appears as a spot approximately circular in shape. These spots will vary widely in size, ranging from approximately a half inch in diameter to the vanishing point.

It is known in the photographic art that the addition of various wetting agents or surface-active agents to an emulsion prior to coating will assist in providing for uniform spreading of the emulsion and will help to prevent the formation of repellent spots. These agents have been found to provide adequate, uniform adhesion between a hydrophobic base support and a hydrophilic emulsion. They have been found to decrease differences in surface tensions within the emulsion and, as a result, alleviate the formation of repellent spots.

It is known in the art to treat textiles, paper, and other solid materials with fluorinated organic compounds to impart oil and soil repellency. See. W. A. Erby et al., U.S. Pat. No. 3,382,097 and H. A. Brown, U.S. Pat. No. 2,934,450.

Most surfactants will not reduce the surface tension of the repellent-causing material in photographic coatings enough to prevent the appearance of spots. Many conventional surfactants—cationic, anionic, amphoteric, nonionic and polyelectrolytic—have been found ineffective in eliminating silicone grease-caused repellent spots. Such surfactants as isooctyl phenyl polyethoxy ethanol, sulfonated aliphatic polyesters, N- and C-cetyl betaines, and sodium lauryl sulfate are ineffective as repellent spot removers for photographic coatings contaminated with silicone grease.

Hydrocarbon surfactants, where the oleophilic group is a hydrocarbon chain, are capable of reducing the surface tension of aqueous solutions from about 70 dynes/cm. to 30–35 dynes/cm. The perfluoro compounds used by this invention have a completely fluorinated carbon chain and a solubilizing group. These compounds are capable of reducing the surface tension of water from 70 dynes/cm. to 15–20 dynes/cm.

The minimum surface tension reduction of hydrocarbon surfactants (30–35 dynes/cm.) is generally achieved at concentrations of 0.1%–1% by weight, while the proposed perfluoro compounds can achieve minimum surface tension (15–20 dynes/cm.) at approximately 0.01% by weight.

Surfactants suitable for use in preventing repellent spots in photographic coatings should exhibit a number of characteristics when incorporated into the coating composition. The surfactant should prevent repellent spots, assist uniform spreading of the coating, enhance wetting by an upper layer when multilayer films are coated, by inert to a large number of compounds in the coating, not cause any fogging, and should not adversely affect the adhesion of adjacent layers. The perfluoro compounds used by this invention exhibit these characteristics to a remarkable degree when added to contaminated photographic coatings.

SUMMARY OF THE INVENTION

It is an object of this invention to provide a new use for perfluoro compounds. Another object is to provide means that will eliminate the effect of oily contaminants in photographic coatings without adversely affecting the properties of the system. A further object is to provide a process which is economical and amenable to large scale operations. A still further object is to provide coating compositions that can be used for all types of photographic emulsions and coatings without increasing fog, or introducing other uncontrollable, undesirable, secondary effects. A final object is to provide an improved photographic product, i.e., a uniformly coated product, that is free from repellent spots.

The objects of this invention are accomplished by the introduction of perfluorocarbon compounds into aqueous water-permeable colloid coating solutions and coating layers therefrom.

Perfluoro compounds found to prevent repellent spots in layers of photographic elements made from aqueous systems during the manufacture of matted arcylic polymer and photographic emulsion compositions are [of two types: (1) perfluoro carbon compounds derived from perfluorocarboxylic acids having the general structure $$C_f\overset{\overset{\displaystyle O}{\|}}{C}-X$$

where $C_f$ is a fully fluorinated (perfluoro) saturated chain consisting of five or more carbon atoms which may or may not be an oxygen interrupted carbon chain; X is OY or an amino group forming with the carbonyl radical an amino group, where Y=H, alkali metal or ammonium group and (2)] fluoro-chemicals derived from perfluorosulfonic and perfluorosulfuric acids having the general structure $$[(C_f)_x(C_H)_y)(Z)] \quad (C_f)(C_H)_y(X)(Z)$$

where $C_f$ is a fully fluorinated *(perfluoro) saturated* carbon chain [as described above] *having six or more carbon atoms*, and in which oxygen atoms may or may not be incorporated; $C_H$ is the saturated hydrocarbon portion of the same chain; $X=SO_2$ or $SO_3$; Z= [amido] *amino* group, hydroxyl group, metal atom or ammonium groups; [x=6 or greater, y=2 or more.] *y=0 or more.*

DESCRIPTION OF THE PREFERRED EMBODIMENTS

In carrying out the invention the fluorochemical is added to a photographic emulsion or to a matted acrylic polymer composition, such as that used as an underlayer for wash-off drafting film in Moede, U.S. Pat. No. 3,353,958, before the coating is applied to a support, e.g., a hydrophobic polymer film base or polymer coated paper base.

In a preferred embodiment of this invention a sample of matted acrylic polymer composition, described in Example I of Moede, U.S. Pat. No. 3,353,958, is contaminated with 0.1 cc./liter of silicone grease. The contaminated formulation is coated on a dimensionally stable vinylidene chloride/methyl acrylate/itaconic acid copolymer coated polyethylene terephthalate film base described in Example IV of Alles, U.S. Pat. No. 2,779,684. A second contaminated sample of the coating composition is treated with 0.75 g./l. of the potassium salt of N-ethyl, N-perfluorooctanesulfonyl glycine, coated on the same polyethylene terephthalate film base and compared with the untreated sample. The treated coating was completely free of the repellent spots which were so prevalent in the untreated coating.

The concentration of perfluoro compound effective in eliminating repellent spots from photographic coatings is 0.10–2.0 g. of compound per liter of coating composition. The amount of the fluorochemical needed to remove repellents depends upon the degree and nature of the contamination.

The following examples will serve to illustrate the nature of the present invention; however, the invention is not intended to be limited to these specific embodiments.

EXAMPLE I

A sample of matted acrylic polymer dispersion having the formulation described in Moede, U.S. Pat. No. 3,353,958 Example I was contaminated with 0.1 cc. of silicone grease per liter of polymer formulation. The contaminated formulation was coated on a vinylidene chloride/methyl acrylate/itaconic acid copolymer coated polyethylene terephthalate film base as described in Example IV of Alles, U.S. Pat. No. 2,779,684. The contaminated formulation gave a coating which showed many objectionable repellent spots.

[To 700 ml. of the contaminated formulation, there was added 70 ml. of a 1.0% aqueous solution of fluorochemical surfactant having the formula

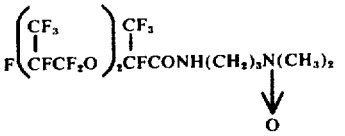

are prepared by the method described in assignee's Bartlett, U.S. application Ser. No. 705,932, filed Feb. 16, 1968.

The treated formulation was coated on the resin subbed polyethylene terephthalate film base to give a coating free from repellent spots.

The matted layer, suitable for drafting purposes, was in no way adversely affected by the presence of the fluorochemical surfactant, i.e., the hardness and ink receptivity of the drafting layer remained unchanged after treatment.

The matted layer was overcoated with a wash-off gelatino-silver halide emulsion described in Example I of Moede, U.S. Pat. No. 3,353,958. The fluorochemical did not alter the photographic or wash-off properties of the film element. All layers exhibited excellent adhesion properties.]

[EXAMPLE II]

To 700 ml. of the contaminated formulation [of Example I], there was added 70 ml. of a 1.0% aqueous solution of the potassium salt of N-ethyl, N-perfluorooctanesulfonyl glycine, prepared by mixing an excess of an aqueous solution of potassium hydroxide with the acid, having the formula

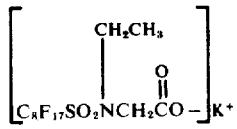

The parent acid of this fluorochemical surfactant is prepared by the method of Brown, U.S. Pat. No. 2,934,450.

The treated formulation was coated on polyethylene terephthalate film base [as described in Example I] to give a coating free from repellent spots. The hardness and oleophilic properties of the matted layer were not adversely affected by the presence of the fluorochemical. Furthermore, no change in photographic effects was observed through five months' aging of the matted film element coated with the gelatino-silver halide emulsion of Moede, U.S. Pat. No. 3,353,958, Example I.

EXAMPLE [III] *II*

To 1,000 ml. of the contaminated sample of Example I, there was added 20 ml. of a 5.0% aqueous solution of a mixture of perfluorocarbon compounds, derivatives of perfluorosulfonic acids prepared by the method of assignee's Pinkerton, U.S. application Ser. No. 726,246, filed May 2, 1968, having the general formula $$C_nF_{2n+1}CH_2CH_2OCH_2CH_2CH_2SO_3Na$$

where n=6, 8, 10, 12, 14.

The treated formulation was coated on polyethylene terephthalate film base as described in Example I to give a coating that was free from repellent spots and whose photographic properties were in no way adversely affected by the presence of fluorochemical surfactants.

[EXAMPLE IV

To 700 mls. of the contaminated solution of Example I, there was added 70 ml. of a 1.0% aqueous solution of a perfluorocarbon compound, described in Bartlett, Ser. No. 705,932, having the formula $$n\text{-}F\left(\begin{matrix}CF_3\\ |\\ CFCF_2O\end{matrix}\right)_2\begin{matrix}CF_3\\ |\\ CFCONH(CH_2)_3\overset{+}{N}(CH_2)_3I^-\end{matrix}$$

The treated formulation was coated on polyethylene terephthalate film base as described in Example I to give a coating that had few repellent spots and whose photographic properties did not change during five months of aging.]

[EXAMPLE V

To 700 ml. of the contaminated sample of Example I, there was added 70 ml. of a 1.0% aqueous solution of a mixture of perfluorocarboxylic acids prepared by the electrochemical fluorination of a mixture of fatty acids as described in Diesslin, U.S. Pat. No. 2,567,011, having the formula $$F(CF_2CF_2)_nCOOH$$

where n=3, 4, 5 and higher in weight ratio 3:2:1.

The treated formulation was coated on polyethylene terephthalate film base per Example I. The incidence of repellent spots was reduced significantly by the addition of the perfluorocarbon compound.]

EXAMPLE [VI] III

A low contrast panchromatic negative gelatino-silver iodobromide (6.4% iodide and 93.6% bromide) aqueous emulsion containing 6% by weight of gelatin and dye sensitized with 3,3'-diethyl-9-methyl-thiacarbocyanine iodide and 3,3'-diethyl-5,5',9'-trimethyl-9-methylthiacarbocyanine iodide, and containing saponin, was prepared and coated on a lacquer-treated paper support. A second sample of the emulsion was prepared and contaminated with [0.15 cc. silicone grease/kg. of emulsion, and this was coated on a paper base. The contaminated emulsion gave a coating with many objectionable repellent spots, while the uncontaminated coating was free from repellent spots. To 500 ml. of the contaminated emulsion, there was added 30 ml. of 1.0% aqueous solution of the fluorochemical mixture described in Example V.

The treated emulsion was coated on the paper base to give a repellent-free coating that showed excellent adhesion properties] *silicon grease and then coated onto paper. The contaminated emulsion gave a coating with many objectionable repellent spots. To 500 ml. of the contaminated emulsion there was added 50 ml. of a 1.0% aqueous solution of the potassium salt of N-ethyl, N-perfluoro-octanesulfonyl glycine, prepared by mixing an excess of an aqueous solution of potassium hydroxide with an acid having the formula*

$$\left[C_8F_{17}SO_2\overset{\overset{CH_2CH_3}{|}}{N}CH_2\overset{\overset{O}{\|}}{C}O-\right]K^+$$

*The parent acid of this fluorochemical surfactant is prepared by the method of Brown, U.S. Pat. No. 2,934,450.*

*The treated emulsion, coated on the paper base, gave a coating which was repellent free.*

[EXAMPLE VII

To 500 ml. of the contaminated photographic emulsion of Example VI, there was added 30 ml. of a 1.0% methanol solution of a mixture of perfluorocarboxylic acids prepared by the reaction of iodides $R_fI$, where $R_f$ has odd values of 5–13, predominantly 5, 7 and 9, prepared by the method of Parsons, U.S. Pat. No. 3,234,294, with oleum according to Hauptschein et al., U.S. Pat. No. 3,351,644, having the general formula $$F(CF_2CF_2)_nCF_2\overset{\overset{O}{\|}}{C}OH$$

where n=2, 3, 4 and higher in weight ratio 3:2:1.

The treated coating, coated on the paper base of Example VI, was free from repellent spots and bubbles.]

[EXAMPLE VIII

The photographic emulsion of Example VI was prepared and coating on a paper base. A second sample of photographic emulsion was prepared and contaminated with silicone grease and coated on a paper base. The uncontaminated coating was free from repellent spots, while the contaminated emulsion gave a coating which had many repellent spots. To 500 ml. of the contaminated emulsion, there was added 30 ml. of a 3.0% solution of the ammonium salts of the fluorochemical surfactants of Example VII having the general formula $$C_nF_{2n+1}\overset{O}{\overset{\|}{C}}NH_4$$

where n=5, 7, 9, 11, 13.

The treated emulsion, coated on the paper base of Example VI, gave a coating which was free from repellents.]

[EXAMPLE IX

To 500 mls. of the contaminated emulsion of Example VI, there was added 30 ml. of a 1.0% aqueous solution of fluorochemical surfactant, described in Bartlett, U.S. Ser. No. 705,947, U.S. Pat. No. 3,472,894, Oct. 14, 1969, having the structure $$F\left(\begin{matrix}CF_3\\ |\\ CFCF_2O\end{matrix}\right)_2\begin{matrix}CF_3\\ |\\ CFCON(CH_2CH_2OH)_2\end{matrix}$$

The treated emulsion, coated on the paper base of Example VI, was free of repellent spots.]

[EXAMPLE X

Two samples of the photographic emulsion described in Example VI were prepared. One sample was coated directly onto the paper base described in Example VI. The other sample was contaminated with silicon grease and then coated onto paper. The contaminated emulsion gave a coating with many objectionable repellent spots. To 500 ml. of the contaminated emulsion there was added 50 ml. of a 1.0% aqueous solution of the fluorochemical surfactant of Example II.

The treated emulsion, coated on the paper base, gave a coating which was repellent free.]

[EXAMPLE XI

A sample of matted acrylic polymer described in Example I, but without isooctyl phenoxy polyethoxy ethanol, was prepared and contaminated with silicone grease and then coated on resin-subbed polyethylene terephthalate film base per Example I. The coated film showed many objectionable repellent spots.

Four separate one-liter portions of the contaminated sample were treated in the following manner:

(1) 10 ml. of 5% aqueous solution of a mixture of sulfonated derivatives of polyester of maleic and fumaric acids plus 30 ml. of a 10% aqueous solution of isooctyl phenyl polyethoxy ethanol were added to the contaminated formulation and coated on polyethylene terephthalate film base.

(2) 30 ml. of a 10% aqueous solution of cetyl betaine was added to the contaminated formulation and coated on polyethylene terephthalate film base.

(3) 30 ml. of a 10% aqueous solution of sodium lauryl sulfate was added to the contaminated formulation and coated on polyethylene terephthalate film base.

(4) 10 ml. of a 10% aqueous solution of the perfluorocarbon compound of Example I was added to the contaminated formulation and coated on polyethylene terephthalate film base.

The samples treated as described in 1, 2 and 3 showed many of the objectionable repellent spots which were seen on the untreated sample. However, the sample treated as described in 4 was free from repellent spots.]

Although the invention is described in connection with a method of eliminating the effect of repellency-causing oily contaminants from matted acrylic polymer and photographic emulsion compositions it should be understood that such descriptions are merely exemplary in that the invention may be adapted with little or no modification to other photographic coating compositions and aqueous systems wherein similar problems exist.

The invention is applicable to all aqueous gelatin solutions used to form gelatin sub-layers, filter layers, antihalation layers which contain dyes and pigments, and antiabrasion layers. The invention is useful with aqueous dispersions of water-permeable organic colloid containing silver halide grains and with magnetizable materials or phosphors in suitable aqueous medium such as water, aqueous ethanol, etc. It is useful with resin [substra] *substrates*, such as an aqueous dispersion of a vinlyidene chloride/[meth] *methyl* acrylate/itaconic acid copolymer and can be used with any gelatino-silver halide emulsion, such as silver iodobromide, silver bromochloride, or silver bromide. The invention may also be applied to coating compositions containing color formers, optical and nonoptical sensitizers, antifoggants, hardeners, plasticizers, toners, other surfactants, and other adjuvants.

The fluorochemical compounds of this invention eliminate repellent spots from photographic coatings, which many of the conventional surfactants fail to overcome. Furthermore, the concentration requirements of these conventional surfactants are usually two to three times greater than those of the fluorochemical compounds of this invention. These perfluoro compounds also improve the coating uniformity of the film.

The embodiments of the invention in which an exclusive property or privilege is claimed are defined as follows:

1. A coated photographic element comprising a support bearing a hydrophobic polymer layer carrying a macro-molecular water-permeable organic colloid layer characterized by containing a perfluorocarbon compound [having an intralinear carbonyl or sulfonyl group and] capable of reducing the surface tension of water to 15–20 dynes per [square] centimeter, said perfluoro compound being [selected from the group:

(1) perfluorocompounds derived from perfluorocarboxylic acids having the general structure $$C_fC\overset{O}{\overset{\|}{}}-X$$

where $C_f$ is a fully fluorinated (perfluoro) saturated chain consisting of five or more carbon atoms which may or may not be an oxygen-interrupted carbon chain; X=OY or an amino group, where Y is H, alkali metal or an ammonium group, and (2) perfluoro compounds] derived from perfluorosulfonic and perfluorosulfuric acids having the general structure $$(C_f)[_x](C_H)_y(X)(Z)$$

where $C_f$ is a fully fluorinated (*perfluoro*) *saturated* carbon chain [as defined in paragraph (1)] *having six or more carbon atoms which may or may not be an*

*oxygen-interrupted carbon chain*; $C_H$ is the saturated hydrocarbon portion of the same chain; X is $SO_2$ or $SO_3$; Z is an amino or hydroxyl group, alkali metal or an ammonium group; [x=6 or greater; Y=2 or more;] *y=0 or more*; said element having radiation-sensitive silver halide in intimate association with said colloid layer.

2. A photographic element according to claim 1 having a water-permeable organic colloid layer containing radiation-sensitive silver halide on the layer containing the perfluorocarbon compound.

3. An element according to claim 1, wherein said support is a polyethylene terephthalate film having an anchoring substratum of a vinylidene chloride addition copolymer of at least 35% vinylidene chloride.

4. An element according to claim 1, wherein said colloid is an acrylic copolymer.

5. A process for reducing repellency spots in a photographic element which comprises coating a hydrophobic polymer surface of a support for the element with an aqueous macromolecular organic dispersion containing about 0.10 to about 2.0 grams per liter of aqueous composition of a perfluorocarbon compound characterized by containing a perfluorocarbon compound [having an intralinear carbonyl or sulfonyl group and] capable of reducing the surface tension of water to 15–20 dynes per [square] centimeter, said perfluoro compound being [selected from the group:

(1) perfluoro compounds derived from perfluorocarboxylic acids having the general structure $$C_fC(=O)-X$$

where $C_f$ is a fully fluorinated (perfluoro) saturated chain consisting of five or more carbon atoms which may or may not be an oxygen-interrupted carbon chain; X=OY or an amino group, where Y is H, alkali metal or an ammonium group, and (2) perfluoro compounds] derived from perfluorosulfonic and perfluorosulfuric acids having the general structure $$(C_f)[_x](C_H)_y(X)(Z)$$

where $C_f$ is a fully fluorinated [carbon chain as defined in paragraph (1)] *(perfluoro) saturated carbon chain having six or more carbon atoms which may or may not be an oxygen-interrupted carbon chain*; $C_H$ is the saturated hydrocarbon portion of the same carbon chain; X is $SO_2$ or $SO_3$; Z is an amino or hydroxyl group, alkali metal or an ammonium group; [x=6 or greater;] y=[2] *0* or more.

6. A process according to claim 5, wherein said dispersion is a dispersion containing an acrylic copolymer.

7. A process according to claim 5, wherein said aqueous dispersion is a gelatin-containing dispersion.

8. A process according to claim 5, wherein said aqueous dispersion is a gelatino-silver halide dispersion.

*9. A process according to claim 5 wherein said perfluoro compound is the potassium salt of N-ethyl, N-perfluorooctanesulfonyl glycine.*

*10. An element according to claim 1 wherein said perfluoro compound is the potassium salt of N-ethyl, N-perfluorooctanesulfonyl glycine.*

*11. An element according to claim 1 wherein said colloid is gelatin.*

*12. Photographic material which comprises at least one gelatin-containing layer that contains as a wetting agent a water-soluble surface active, aliphatic perfluorosulfonic acid derivative of the formula*

$$C_f-SO_2-\underset{\underset{R_2}{|}}{N}-R_1-CO-O-X$$

*in which*

*$C_f$ is a perfluorinated alkyl group containing 6 or more carbon atoms,*

*$R_1$ is methylene,*

*$R_2$ is ethyl and*

*X is an alkali metal atom.*

*13. Photographic material as claimed in claim 12, wherein the perfluoro compound corresponds to the formula*

$$F_3C-(CF_2)_7-SO_2-N\begin{matrix}CH_2-COOK\\CH_2-CH_3\end{matrix}$$

*14. Photographic material which comprises at least one gelatin-containing layer that contains as a wetting agent a water-soluble surface active, aliphatic perfluorosulfonic acid derivative of the formula*

$$C_f-SO_2-Z$$

*in which*

*$C_f$ is a perfluorinated alkyl group having six or more carbon atoms, and*

*Z is an amino group.*

*15. Photographic material which comprises at least one macromolecular water-permeable organic colloid-containing layer that contains as a wetting agent a water-soluble surface active, aliphatic perfluorosulfonic acid derivative of the formula*

$$C_f-SO_2-\underset{\underset{R_2}{|}}{N}-R_1-CO-O-X$$

*in which*

*$C_f$ is a fully fluorinated (perfluoro) saturated carbon chain containing 6 or more carbon atoms*

*$R_1$ is methylene*

*$R_2$ is ethyl and*

*X is an alkali metal atom.*

*16. Photographic material as claimed in claim 15 wherein the perfluoro compound corresponds to the formula*

$$F_3C-(CF_2)_7-SO_2-N\begin{matrix}CH_2-COOK\\CH_2-CH_3\end{matrix}$$

* * * * *